United States Patent
Kidney et al.

(10) Patent No.: US 7,068,294 B2
(45) Date of Patent: Jun. 27, 2006

(54) ONE-TO-ONE DIRECT COMMUNICATION

(75) Inventors: Nancy G. Kidney, San Jose, CA (US); Andrew David Warnes, Lowestoft (GB); Anton O. Andrews, Eindhoven (NL)

(73) Assignee: Koninklijke Philips Electronics N.V., Einhoven (NL)

( * ) Notice: Subject to any disclaimer, the term of this patent is extended or adjusted under 35 U.S.C. 154(b) by 749 days.

(21) Appl. No.: 09/823,460

(22) Filed: Mar. 30, 2001

(65) Prior Publication Data

US 2002/0140625 A1 Oct. 3, 2002

(51) Int. Cl.
*G09G 5/00* (2006.01)

(52) U.S. Cl. .......................... 345/700; 345/1.2; 345/2.2; 345/716; 345/761; 345/156

(58) Field of Classification Search ........... 345/1.1–1.2, 345/2.1–2.3, 751–755, 156–158, 856, 761, 345/473–474, 835–839, 861, 769, 758, 700, 345/716, 719, 727; 463/7–9
See application file for complete search history.

(56) References Cited

U.S. PATENT DOCUMENTS

| | | | |
|---|---|---|---|
| 5,068,646 A | 11/1991 | Baker | 345/473 |
| 5,694,150 A * | 12/1997 | Sigona et al. | 345/856 |
| 5,774,673 A | 6/1998 | Beuk et al. | 709/236 |
| 5,797,085 A | 8/1998 | Beuk et al. | 455/88 |
| 5,910,797 A | 6/1999 | Beuk | 345/157 |
| 5,969,697 A * | 10/1999 | Tani et al. | 345/2.1 |
| 6,028,866 A | 2/2000 | Engel et al. | 370/461 |
| 6,044,397 A | 3/2000 | Eleftheriadis et al. | 725/139 |
| 6,311,195 B1 * | 10/2001 | Hachiya et al. | 707/512 |
| 6,370,597 B1 * | 4/2002 | Eady et al. | 710/15 |
| 6,597,383 B1 * | 7/2003 | Saito | 345/860 |

OTHER PUBLICATIONS

U.S. S/N 09/635,548 "Mobile Micro Portal".

U.S. S/N 09/128,839 "Remote control Has Animated GUI".

* cited by examiner

*Primary Examiner*—Regina Liang
*Assistant Examiner*—Duc Q Dinh

(57) ABSTRACT

The progress of transferring an electronic object from a sending handheld to a receiver is graphically represented as an gradually object sliding out of view on the display of the sender and gradually sliding into view on the display of the receiver. A gravity sensor in the handheld is used to determine the transmission's data rate. This visual feedback is an ergonomic feature for, e.g., electronic toys.

3 Claims, 3 Drawing Sheets

ONE-TO-ONE DIRECT COMMUNICATION

FIELD OF THE INVENTION

The invention relates to a graphical user interface (GUI) of a data processing system.

BACKGROUND ART

U.S. Pat. No. 5,910,797 (Philips Electronics), incorporated herein by reference, relates to a portable data processing apparatus with an integrated screen that displays one or more graphical or other objects. The screen has a gravitation-controlled sensor for measuring a spatial orientation thereof. The apparatus has a programmed data processor for under control of a predetermined range of spatial orientations imparting a non-stationary motion pattern to a predetermined selection among the objects. The motion can be used in the way of a joystick. Eventually it may result in off-screen dumping, loading, or transfer of an associated object. A predetermined amount of the motion represents a transfer of an associated predetermined object between the screen and a predetermined off-screen device. In this way, inclination of the apparatus may effect data processing effects per se, even apart from the moving around of the object. Storage, printing, reading from a memory chip card, deleting of text, and transmission to a remote data processing device are realizations of this kind of feature. In case of text, vertical motion thereof may be organized to represent scrolling. In the latter case even an ongoing dialog between two apparatuses of the kind described can be maintained.

SUMMARY OF THE INVENTION

The current invention relates to a system of data processing devices for the transfer of an electronic object from one device to another. The invention supports the impression that the object gradually disappears from the transmitting device and gradually appears at the receiving device. For example, the object is associated with, or comprises, a graphical representation. Animation is used to let the representation gradually slide beyond the border of the visual portion of a display monitor of the transmitting device, and gradually slide into the visual portion of the display monitor. The disappearing representation and the appearing representation can, but need not be the same. As another example, the sending of the object is associated with the transmitting device rendering an auditory representation of the object being transferred, and the object during receipt is associated with the rendering of a similar or another auditory representation at the receiving device. The auditory representations rendered support the impression of a gradual transfer of the object from the transmitting device to the receiving device at the time of transfer.

In an embodiment of the invention, communication of the electronic object between the devices is controlled by a line-of-sight between the devices. The communication can be initiated when the devices are within a short-range of one another.

Preferably, the transmitting device is a handheld device and comprises an orientation sensor to determine the orientation of the device with regard to gravity. The orientation of the handheld device is used to let the user control the transfer of the object. For example, the transmitting device is tilted towards the receiving device so as to initiate the flow of the object to the receiving device as if the object were a liquid, or so as to initiate the jumping or sliding of the object as if it were an animated being.

Thus the invention provides a highly intuitive user-interface so as to facilitate the transfer of electronic objects. This can be used, for example, within a game or toy context. Also, a small child can easily learn how to manipulate the devices so as to transfer, e.g., graphical representations. For example, a handheld data processing device has a repository of electronic objects, e.g., applets, each specific one of which lets a toy function or respond in a specific way when installed on the toy. The child can easily program the toy intuitively using the graphical file transfer indication as visual feedback. This gives the child the impression of pouring the file into the toy as if it were a liquid.

Alternatively, a medical monitoring device using the animation in combination with the file transfer being initiated by tilting can be used by anyone without an intricate excursion into a manual on the control software or menu selection.

An implementation of the communication protocol uses, e.g., applets for the disappearing and appearing representations when the object gets transferred. The relative orientations of the communicating devices as sensed by, e.g., the gravity sensors control the way in which the representations disappear and re-appear. Alternatively or in combination with the applets, a succession of bitmaps gets transferred to give the visual impression of a smoothly sliding physical object.

An implementation of the invention uses, e.g., the MPEG4 protocol. MPEG-4 is a standard that addresses the coding of audio-visual (AV) information as individual objects. This standard relates to a system for the composition and synchronized play-back of these objects. In general, the user observes an AV scene that is composed following the design of the scene's designer. Depending on the degree of freedom allowed by the designer, the user has the option to interact with the scene. Operations that the user can perform include, e.g., change the viewing/listening point of the scene, e.g. by navigation through a scene; drag objects in the scene to a different position; or trigger a cascade of events by clicking on a specific object, such as starting or stopping a video stream. The scene navigation allowed can be put under control of the gravity sensor for the purposes mentioned above, to simulate the flowing or sliding of, e.g., a video clip from one device to another.

BRIEF DESCRIPTION OF THE DRAWING

The invention is explained in further detail, by way of example and with reference to the accompanying drawing, wherein.

Throughout the drawing, same reference numerals indicate similar or corresponding features.

DETAILED EMBODIMENTS

An aspect of the invention relates to the visual or auditory feedback given to the user of data processing device, e.g., a handheld, when the device transits or receives an electronic document, such as a graphics object, that allows user-interaction. The object can be communicated among devices in a highly intuitive manner as explained below. This ergonomic approach is believed to be highly suitable for, e.g., gaming, educational or facilitating purposes or for toys, etc.

Figure 1:
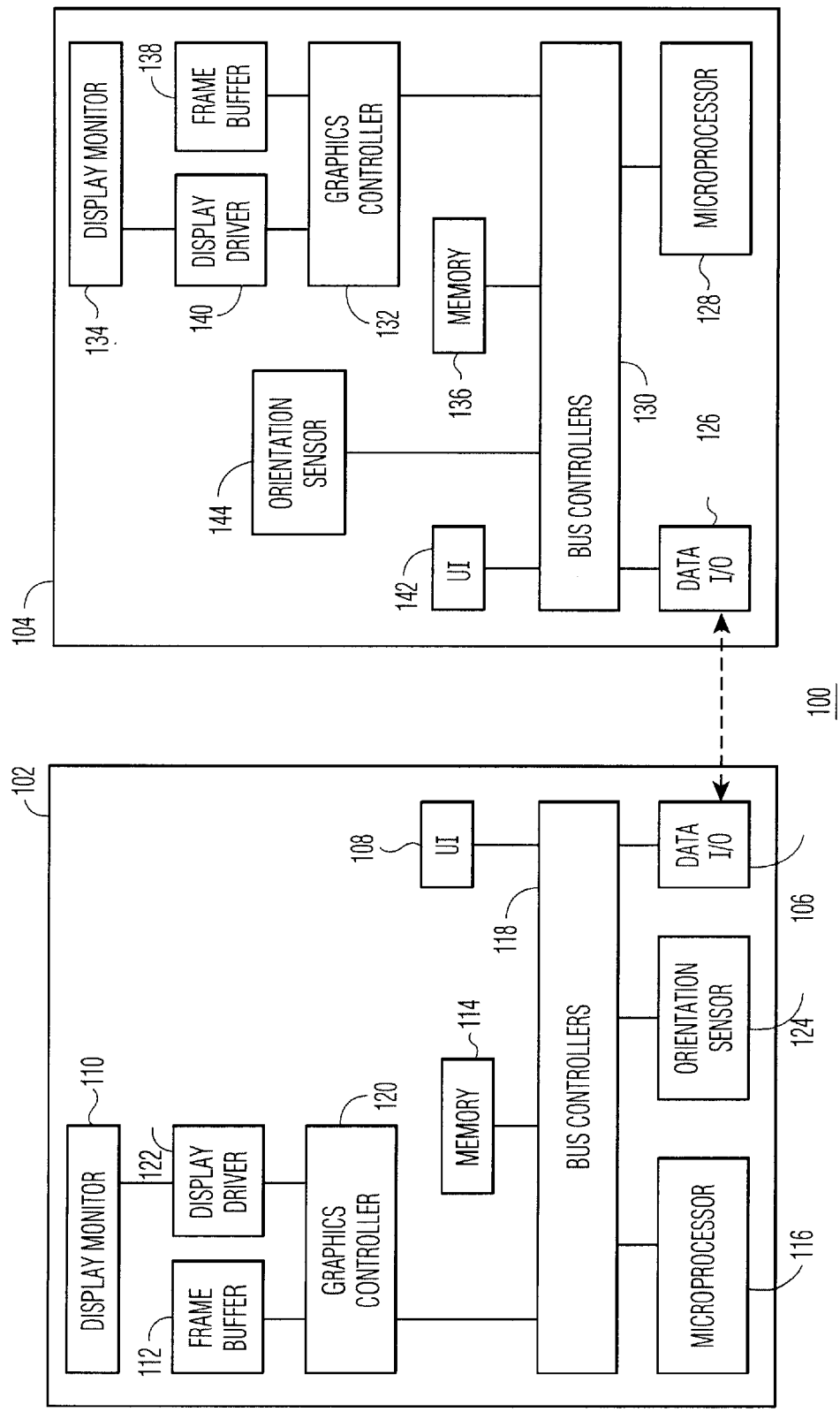
FIGS. 1 and 2 are block diagrams of a system in the invention.

FIG. 1 is a functional block diagram of a data processing system 100 in the invention. Some of the functionalities shown may be implemented sharing the same hardware or software components. System 100 comprises a first data processing device 102 and a second data processing device 104. In the example shown, device 102 functions as the transmitter, and device 104 and the receiver.

First device 102 comprises a data output 106 for, in this example, the wireless transmission of data; a user-interface (UI) 108 with user controls for enabling a user to initiate the transmitting of an electronic object via data output 106; and a display monitor 110 for displaying the object or a graphical representation thereof. UI 108 and monitor 110 may be combined in a touch screen LCD, for example. Device 102 further comprises a frame buffer 112, an off-screen memory 114, a microprocessor 116, bus controllers 118, a graphics controller 120, and a display driver 122.

A software application run on microprocessor 116 controls the processing of the data. Input is received from UI 108 via bus control 118 and translated into associated graphical events at monitor 110 via controller 120 and driver 122. Frame buffer 112 is coupled to controller 120 and stores the information content that is at least partly shown on monitor 110. Off-screen memory 114 stores, among other things, bitmaps that are mapped into frame buffer 112 and/or data files that describe the available bitmaps. Microprocessor 116 controls, in addition to the objects displaying, the object's animation and the data transmission under software control upon a proper control input. Accordingly, first device 102 is a configuration controller for transmitting an object to a second device 104.

In this example, device 102 also comprises an orientation sensor 124 that supplies data representative of the orientation of device 102, e.g., with respect to gravity. The data supplied by sensor 124 is used to, e.g., initiate the transmission of an electronic object, for example, when device 102 is tilted. Also, the data is used to control the rate at which the object's graphical representation displayed on monitor 110 disappears from the monitor's display screen. The larger the tilting angle of handheld device 102 is, the faster is the representation sliding out of view. The tilting can also be used to affect the transmission's data rate so as to simulate the pouring of a liquid out of a container as is explained below. Orientation sensor 124 comprises, e.g., a gyroscope, an arrangement of mercury cells, etc.

Second device 104, here functioning as the receiver, comprises a data input 126 for receipt of the data. The data is processed under control of a microprocessor 128 that via bus control 130 supplies the data to a graphics controller 132. Controller 132 controls the displaying of a graphics object, associated with the data, on a display monitor 134, using a memory 136, a frame buffer 138 and a driver 140. The processing is user-controllable via a UI 142 and, in this example, also via an orientation sensor 144. Through UI 142 and/or sensor 144 the user of device 104 can influence the data processing, for example as follows. Device 104 is made receptive to the data from device 102 through a user-interaction with UI 142. The tilting angle sensed by sensor 144 can be used to negotiate a data rate with device 102, that can be thought of as the metaphor of communicating vessels. Depending on the data rate negotiated, the graphical representation of the object being transferred from device 102 to device 104 slides out of view of monitor 110 and into view of monitor 134.

Data I/O 106 and 126 communicate preferably in a wireless fashion using, for example, RF (e.g., Bluetooth), IR, ultrasound.

FIG. 1 shows first and second devices 102 and 104 as having similar data processing capabilities. That is, devices 102 and 104 can both serve as transmitter and sender at different times when communicating with one another. A multi-player video game can be implemented wherein, e.g., manual dexterity of each user determines whether or not a graphical object sent by another player takes possession of the receiver's screen.

Figure 2:
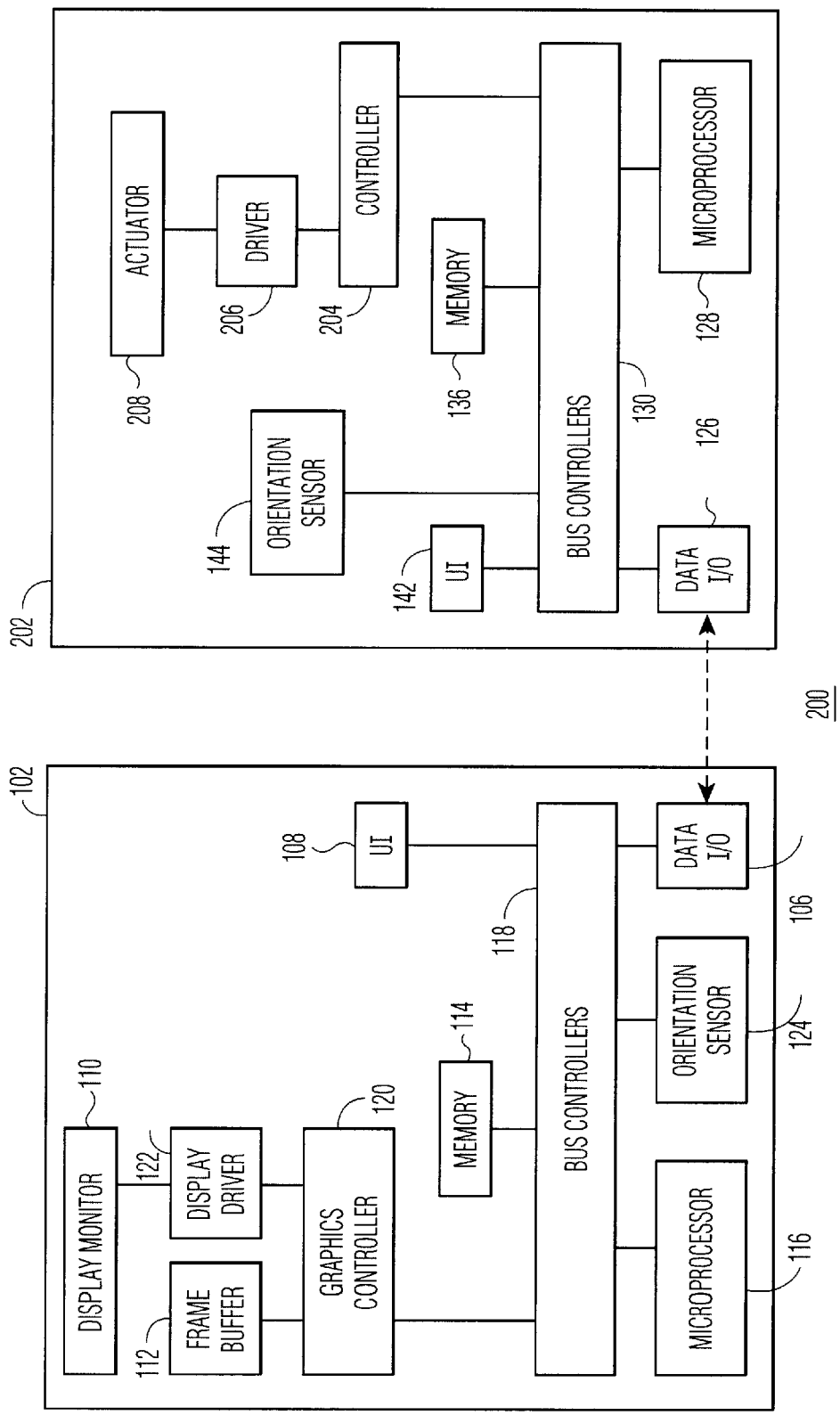

FIG. 2 is a diagram of another example of a data processing system 200 with first device 102 and a third device 202. Device 202 is an apparatus, e.g., a toy, whose functionality is software controllable. Different software objects or applications, e.g., applets, are stored at device 102, e.g., in memory 114 and can be selected via UI 108 for transfer to device 202. Device 202 is reconfigurable by the object upon its receipt from first device 102. For example, each application is graphically represented in a menu to facilitate the selection. The respective graphical representations illustrate the various functionalities of device 202 when the associated application is installed. For example, device 202 is made of a component that controls the operation of an apparatus that responds to speech input. Different applications determine different responses to speech input. Device 202 is, for example, a module that can be used with a construction set to make speech controlled model vehicles, robots, etc. Device 202 in this example has an actuator 208 coupled to a driver 206 that is controlled by a controller 204. Controller 204 in turn is controlled by processor 128. As set forth above, one having ordinary skill in the art would understand that device 202 is a reconfigurable apparatus controllable via the object transmitted by first device 102.

For a child, it is relatively easy to build a structure, or a vehicle, but it is not simple to program the electronics to control the structure. The invention allows control applications to be literally downloaded into device 202, as display 110 gives visual feedback, through the disappearing graphical representation, about the progress and completion of the loading, and orientation sensor determines the rate at which the downloading proceeds.

Figure 3:
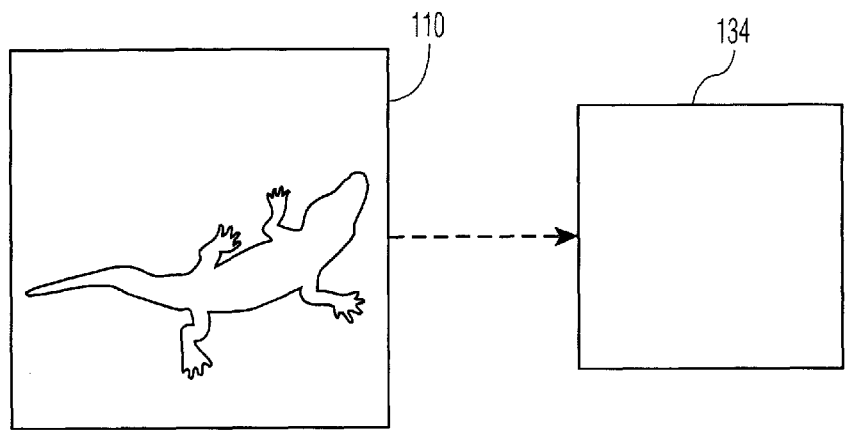
FIGS. 3, 4 and 5 illustrate the gradual disappearance and appearance of the graphical representation during the transfer of an electronic object.
Figure 4:
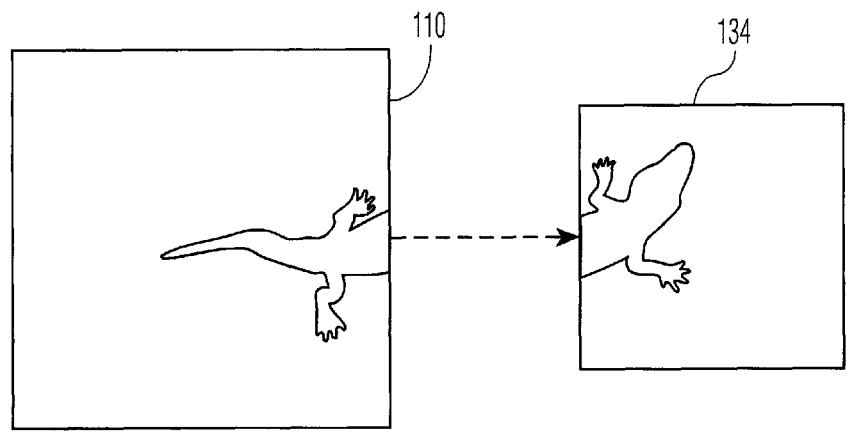
Figure 5:
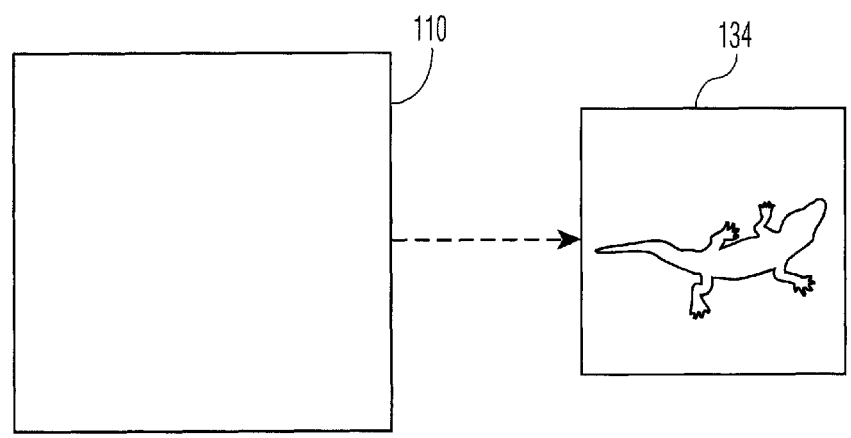

FIGS. 3–5 illustrate the visual feedback regarding the transfer of an electronic file from device 102 with display monitor 110 to device 104 with display monitor 134. The visual feedback here is the gradual sliding of an object 300 off the screen of monitor 110 and into view on monitor 134.

The following documents are incorporated herein by reference:

U.S. Ser. No. 09/128,839 filed Aug. 4, 1998 for Jan van Ee et al., for REMOTE CONTROL HAS ANIMATED GUI. This document relates to a remote control device for remote control of home theater equipment. The device has a display with a touch screen representing a GUI. User-activation of the GUI causes its appearance to change. The change is effected through animation. Animation is the simulation of movement created by displaying a series of bitmaps. The animation lets the user perceive the change as a smooth transition. Thus the impression is avoided of an abrupt confrontation with a new lay-out.

U.S. Ser. No. 09/635,548 filed Aug. 10, 1998 for Eugene Shteyn et al., for MOBILE MICRO PORTAL. This document relates to a method for enabling a user of a mobile communication device to receive a short-range wireless facilitation signal on the device. A beacon transmits the facilitating signal. When the user's device is within range of the beacon the facilitation signal initiates associating the facilitating signal with a service. The initiating leads conditionally to alerting the user to the service, depending on a user-profile, preferably stored at the mobile device. Accordingly, the user is enabled to get only information about services that are of interest to him/her as indicated by the user-profile. If the service associated with the facilitation signal matches the user-profile, the user gets alerted to the service via the device, e.g., via a text message generated on a display of the communication device. If the service does not match the profile, the device does not alert the user. The alerting text message can be generated in a way similar to paging or SMS (Short Message Service). SMS uses GSM communication and allows sending of text messages of up to 160 characters to mobile phones. Preferably, the user can program the device so that he/she is to be alerted through an audible signal if the service matches the user's profile. This way, the user does not have to keep an eye on the mobile communication device all the time. Preferably, the device can store the facilitation signals and/or the messages thus received for retrieval later on. Other mechanisms to alert the user can be used, e.g., a visual warning on the mobile communication device or a tactile warning through a vibration unit in the communication device as known from pagers, etc. Accordingly, alerts can be tactile (vibration), text, visual or audible. Different modalities, e.g., amplitudes or styles, can be used for different priorities within the current user's context. The context (filter) selection by the user may well control the modality of any alerts as well as what opportunities are alerted. Emerging wireless PAN/LAN network protocols, such as IrDA, Bluetooth and HomeRF, enable mobile devices to become a dynamic part of a home-, office- or community network. Especially a mobile phone equipped with, e.g., Bluetooth-compatible hardware and software, can communicate directly with a local device and/or local service. In general, each network component can be a service-offer-point (SOP). The network comprises, for example, a home network, an office network, or an infrastructure of components in a public place such as a shopping mall, a street, an airport, a local town network or community network, etc. Each component has a beacon that transmits or broadcasts a facilitation signal associated with meta-ata relating to information content or services provided at, or represented by, the component or associated with the network. The beacon's range is typically short-range as with Bluetooth.

U.S. Pat. No. 6,044,397 relates to providing an interface facility for MPEG-4 authoring, bitstream manipulation, editing and interpretation, resulting in coded bitstreams which are easier to test, check and debug while conforming to the MPEG-4 standard. The specified interfaces can also facilitate graceful degradation in the face of decreased resources by allowing editing of bitstreams. The specified interfaces can also allow creation of decodable bitstreams in response to the user requests either directly or indirectly embedded in audiovisual applications, as well as future services. The invention specifies a bitstream input/output package in the Java programming language to facilitates bitstream encoding and decoding of audio-visual media objects, especially when coding uses the MPEG-4 standard. The invention separates fixed length and variable length coding, and allows flexible parsing which offers the potential of optimized implementation as needed to aid real-time or near real-time operation.

U.S. Pat. No. 6,028,866 relates to a group of end-user apparatuses, such as a game computer or a PDA, that communicate wirelessly, for instance via infra-red. In order to increase the reliability of the communication, the end apparatuses communicate via a central apparatus. This makes it easier to maintain contact. Furthermore, conventional acknowledgement schemes can be used to increase the reliability of the communication between an end apparatus and the central apparatus. Each end apparatus comprises execution means for executing a group application. During the execution, the group application communicates to a corresponding group application in at least one end apparatus. The communication takes place by exchanging application messages. To this end, an end apparatus uses message sending means to send the application message to the central apparatus. Message receiving means of the central apparatus receive the message. Group resolution means of the central apparatus determine for which group of end apparatuses the received application message is destined. The group resolution means use message sending means to transmit the received application message to end apparatuses of the group. Message receiving means in the end apparatuses receive the message.

U.S. Pat. No. 5,774,673 relates to a data processing system that allows an apparatus, such as a computer or a PDA, to establish communication between a local application and applications in at least one other apparatus. The communication is established when a user of an apparatus triggers execution of a section application. An active activation unit invites applications in the other apparatuses to join by using a message sending unit to transmit a broadcast frame to all apparatuses, requesting activation of the selected application. The broadcast frame specifies which application is being activated. The active activation unit then determines a communication channel which corresponds to the application and the selected application, stored in storage, is executed by an execution unit. The broadcast frame is received by a message receiving unit in other apparatuses. A passive activation unit verifies whether the receiving apparatus has an application, which corresponds to the specified application and whether such an application needs to be activated. If so, the passive activation unit determines which communication channel corresponds to the application (the same communication channel as determined by apparatus) and uses an execution unit to execute the corresponding application, which is stored in storage. The group of applications, which in this way has been formed, communicates by using group frames. The group frames include a channel field which identifies a communication channel. The formed group of applications uses the communication channel which corresponds to the selected application in the apparatus.

U.S. Pat. No. 5,797,085 relates to a communication system that allows a group of at least three apparatuses, such as game computers and Personal Digital Assistants (PDAs), to communicate wirelessly by using, for instance, infrared transmission. The apparatuses are the same from a communication point of view. A message frame transmitted by an apparatus can, therefore, be received by all other apparatuses, which are part of the system. Reliability is increased by acknowledging correct reception of a message frame and retransmitting a message frame up to a predefined maximum number of times if no acknowledgement frame is received. The chance of message frames and/or acknowledgement frames colliding is reduced. After a message frame has been transmitted, a following defined time period is reserved for acknowledging reception of the message frame. Upon receiving the message frame, the receiving apparatuses wait a random time, within the defined period, before acknowledging. The first apparatus to time-out transmits an acknowledgment frame. The other apparatuses do not transmit an acknowledgement frame. Correct reception of a message frame is, therefore, only acknowledged by one apparatus. This is accomplished through use of two timers.

U.S. Pat. No. 5,068,646 relates to a technique for achieving read-time animation in bit-map data displays in apparatus having a display memory. The display memory stores digital codes to give the color and/or luminance of each pixel of the display. The display memory is accessed repeatedly in a recurrent display scan cycle to read-out the digital codes to produce the display. The time available for modifying the contents of the display memory to achieve animation of an object against a fixed background is very small and access to the display memory for the display scan and for writing-in new digital codes must not be in conflict. A method is therefore proposed of continually modifying the display memory content, to achieve object animation, in which the shape of an object is coded into a machine code program (e.g., by a compiler) before the display is run and then the machine code program is used as a sub-routine as the display is run to move the data for the object shape (with or without modification) to different memory locations of the display memory, with the data for the background areas involved being saved and re-written as the animation progresses and the object shape moves over the background.

What is claimed is:

1. A data processing system comprising:

a first data processing device with a first display monitor;

a second data processing device;

wherein:

the first device has a data output for transmission of an electronic object;

the second device has a data input for receipt of the object transmitted by the first device;

the object corresponds with a graphical representation;

upon initiating of the transmission, the first device renders the representation as automatically and gradually leaving a visual portion of the first display monitor as a visual feedback representative of a progress of the transmission, and wherein at least the first device or the second device has an orientation sensor for control of a data rate of the transmission in dependence of the orientation of the sensor with respect to gravity.

2. A data processing system comprising:

a first data processing device with a first display monitor;

a second data processing device; wherein:

the first device has a data output for transmission of an electronic object;

the second device has a data input for receipt of the object transmitted by the first device;

the object corresponds with a graphical representation;

upon initiating of the transmission by an orientation sensor, the first device renders the representation as automatically and gradually leaving from a visual portion of the first display monitor as a visual feedback representative of a progress of the transmission, and wherein the first device comprises a configuration controller and the second device comprises an reconfigurable apparatus controllable via the object upon receipt.

3. A software application for control of transferring an electronic object between data processing devices, wherein:

at least one of the devices has a display monitor;

the object has a graphical representation; and the software application controls a visual feedback of a progress of the transferring by control of a displaying of the representation as gradually entering or leaving a visual portion of the display monitor, the graphical representation automatically gradually entering or leaving following an initiation of the control, and wherein:

at least one of the devices has an orientation sensor for sensing an orientation of the sensor with respect to gravity; and the application controls a data rate of the transferring depending on the orientation sensed.

* * * * *